US007859830B2

(12) United States Patent
Morrison

(10) Patent No.: US 7,859,830 B2
(45) Date of Patent: Dec. 28, 2010

(54) MOBILE QUICK-KEYING DEVICE

(76) Inventor: John J. Morrison, P.O. Box 325, Albion, WA (US) 99102

( * ) Notice: Subject to any disclaimer, the term of this patent is extended or adjusted under 35 U.S.C. 154(b) by 0 days.

(21) Appl. No.: 12/075,187

(22) Filed: Mar. 10, 2008

(65) Prior Publication Data

US 2008/0218950 A1    Sep. 11, 2008

Related U.S. Application Data

(60) Provisional application No. 60/894,136, filed on Mar. 9, 2007.

(51) Int. Cl.
*H05K 5/00* (2006.01)
(52) U.S. Cl. .............................. 361/679.08; 361/679.56; 361/679.3; 361/679.21; 341/22; 345/168; 400/472
(58) Field of Classification Search ............ 361/679.56, 361/679.08, 679.09, 679.21, 679.26, 679.55, 361/679.19, 679.3; 341/22; 345/168; 400/472
See application file for complete search history.

(56) References Cited

U.S. PATENT DOCUMENTS

2002/0118175 A1* 8/2002 Liebenow et al. ........... 345/168

2005/0104855 A1* 5/2005 Grossmeyer ................ 345/169
2007/0268261 A1* 11/2007 Lipson ....................... 345/169
2009/0146848 A1* 6/2009 Ghassabian .................. 341/22

FOREIGN PATENT DOCUMENTS

| JP | 2002-519772 | 7/2002 |
| KR | 10-2006-0032870 | 4/2006 |
| KR | 10-0651854 | 12/2006 |

OTHER PUBLICATIONS

International Search Report dated Jun. 30, 2008 in PCT Application Serial No. PCT/US08/003137, International Filing Date Mar. 10, 2008.

* cited by examiner

*Primary Examiner*—Jayprakash N Gandhi
*Assistant Examiner*—Ingrid Wright
(74) *Attorney, Agent, or Firm*—Haynes Beffel & Wolfeld LLP; Ernest J. Beffel, Jr.

(57) ABSTRACT

The present invention relates to making data entry on a handheld device quicker and easier, while still being able to interact with the software/firmware in a familiar way. In particular, we disclose a device and method for text entry that uses a combination of keys on the front and back of a device held in two hands. Keys on the back are utilized in a manner that takes advantage of the muscle memory associated with QWERTY keyboards. Particular aspects of the present invention are described in the claims, specification and drawings.

21 Claims, 3 Drawing Sheets

Front    Back

Front

Back

Back

Front

Back qwer|tyulop  
asdfghjkl;  
zxcvbnm,./  
FIG. 6A – up qwertyulop  
asdfghjkl;  
zxcvbnm,./  
FIG. 6B – down qwertyulop  
asdf|gh|jkl;  
zxcvbnm,./  
FIG. 6C – in qwer|ty|ulop  
asdf|gh|jkl;  
zxcv|bn|m,./  
FIG. 6D – in alt.

qwertyulop  
|ASDF|gh|JKL:|  
zxcvbnm,./  
FIG. 6E – shift qwer|TY|ulop  
asdfghjkl;  
zxcvbnm,./  
FIG. 6F – in +
up + shift

MOBILE QUICK-KEYING DEVICE

RELATED APPLICATION

This application is related to U.S. Provisional Patent Application No. 60/894,136 filed Mar. 9, 2007. The related application is incorporated by reference.

BACKGROUND OF THE INVENTION

The present invention relates to making data entry on a mobile or tethered handheld device quicker and easier, while still being able to interact with the software/firmware in a familiar way. In particular, we disclose a device and method for text entry that uses a combination of keys on the front and back of a device held in two hands. Keys on the back are utilized in a manner that takes advantage of the muscle memory associated with QWERTY keyboards.

Data entry to mobile handheld devices is slow and cumbersome. Everything from typing text messages on a cell phone or Blackberry, to drawing on a Palm Pilot touch screen takes a lot more time than typing on a keyboard. Thumb boards have become popular on Treo® and Blackberry® devices. Apple's iPhone® uses an on screen touch pad. Prior Palm® personal digital assistants used a special language called "Graffiti" to enable recognition of hand drawn symbols. None of these approaches is as fast as a keyboard.

An opportunity arises to develop better input devices. Better, more easily operated text entry may result, with resulting improvement in the use of email, text messaging, web surfing and many other applications.

SUMMARY OF THE INVENTION

The present invention relates to making data entry on a mobile handheld device quicker and easier, while still being able to interact with the software/firmware in a familiar way. In particular, we disclose a device and method for text entry that uses a combination of keys on the front and back of a device held in two hands. Keys on the back are utilized in a manner that takes advantage of the muscle memory associated with QWERTY keyboards. Particular aspects of the present invention are described in the claims, specification and drawings.

BRIEF DESCRIPTION OF THE DRAWINGS

FIG. 5B depicts alternative key shapes.

FIGS. 6A-6F illustrate modification of back side key functions, based on selection of front side key combinations and how the state of front side key combinations can be confirmed to a user.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

The technology disclosed makes data entry on a mobile handheld device quicker and easier. It takes advantage of muscle memory for finger operation of a keyboard. Our device configuration takes advantage of a user's ten digits while entering data on a mobile device. The configuration may be ergonomically comfortable. Hardware and software that interpret keystrokes relate familiarity with the standard keyboard to data entry on the mobile device without a full keyboard. The keyboard layout described can be modified to engage fewer digits, by reducing the number of shift keys or by reducing the number of fingers used.

Figures 1, 2:
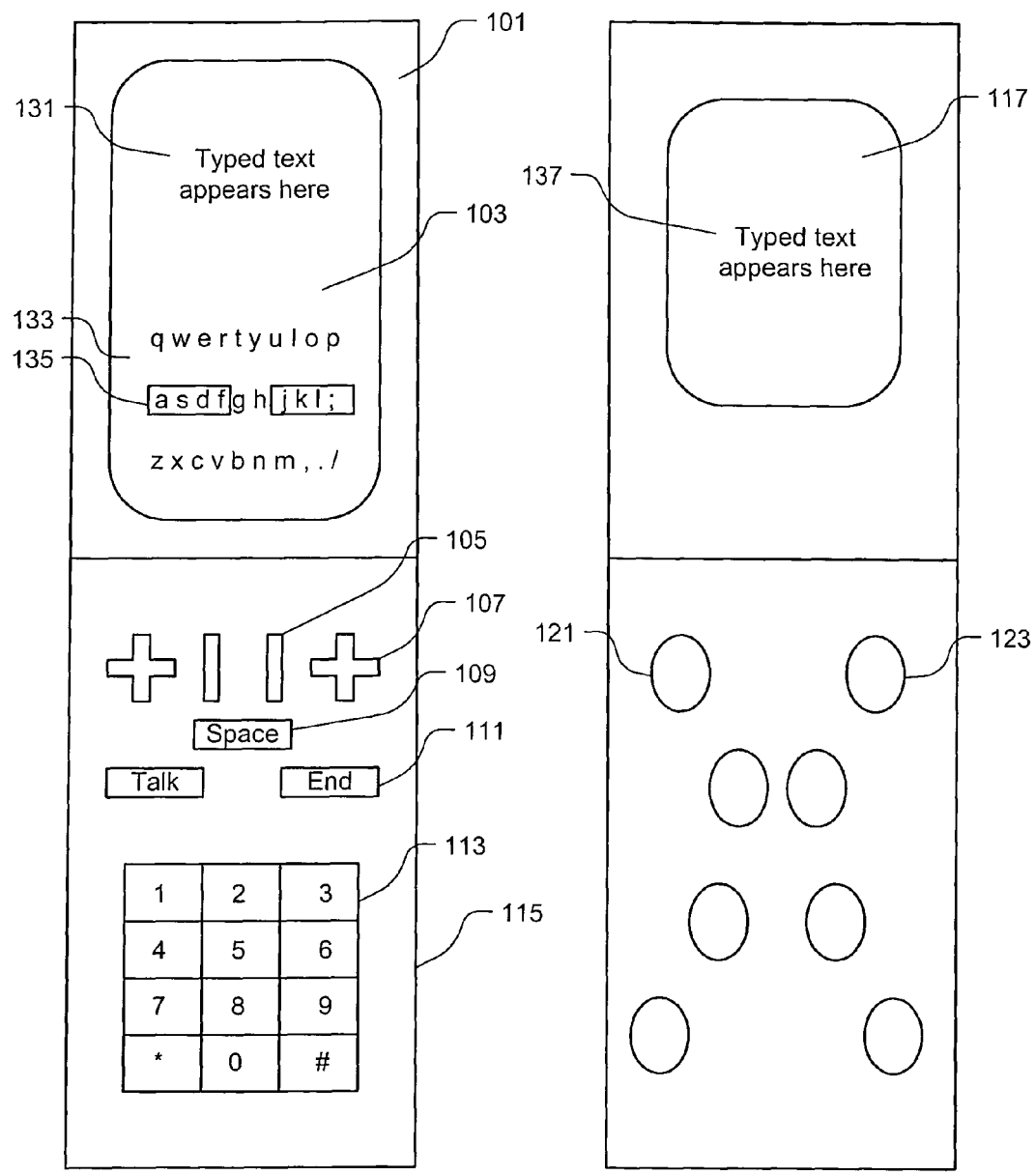
FIGS. 1 and 2 illustrate front and back keyboard arrangements for a cell phone sized device.
Figure 4:
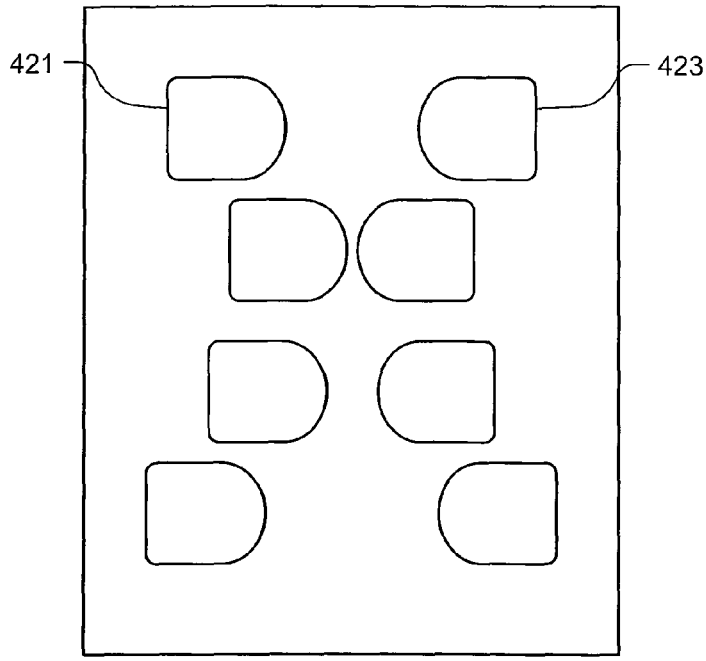
FIG. 4 illustrates an alternate key shape for back side keys, suitable for a wider, PDA-sized device.

The system can be implemented using 13 to 29 keys, with some keys placed on the back of a mobile device. One general layout of keys is depicted in FIGS. 1 and 2. (Alternative housing configurations are depicted in FIGS. 4-5 and discussed below.) The user holds the device housing 115 between their palms allowing their fingers to wrap around and rest on eight finger keys 121, 123 on the back of the device. A set of eight finger keys may be supplemented with additional keys (not shown), increasing the finger key count to 12, while preserving the position of the will be eight "home" keys. In a 10, 11 or 12 key configuration, the first and, optionally, the little fingers of the hands could move sideways, as they do on a QWERTY keyboard, to engage "g", "h", apostrophe and enter keys. The thumbs rest on directional pads 107, joy sticks or other shift selectors on the front or side of the device. The thumb also may have access to several other keys (Spacebar 109, Enter 105, 111, Backspace 105, 111, Ctrl, Alt, and Esc for example). The user thumbs the directional pads to translate the meaning of finger key strokes "up", "down", and "in", from the "home position" as taught in standard typing. Optionally, the translation resulting from the current state of the thumb keys is visually indicated 135 on a display 103, by logic and resources carried by the housing that process input from the directional pads. The finger buttons then become the characters that would normally be typed by the corresponding finger. For instance, keys 121, when unshifted 135, would type the letters "asdf". The typed text appears 131 on a front side display 103 and optionally appears 137 on a back side display 117. At least for cell phones, it may be desirable to have a numeric key pad 113, in addition to the finger keys.

The system logic and resources translate keystrokes on this novel keyboard into characters usable by other software. The front side keys may be configurable to interact with various operating systems where a mouse is necessary, games, media player software/firmware, and mobile phones firmware.

The system will allow users to enter data faster on a mobile device without having to completely retrain muscle memory of the fingers.

The Mobile Quick-Keying system is useful for any handheld mobile device on which access to a full keyboard is a benefit for easy data entry.

The following example is intended to illustrate Mobile Quick-Keying, however the concept is not limited to this example. In this example the Mobile Quick-Keying system is applied to a mobile phone.

To Quick-Key on a phone, such as depicted in FIGS. 1 and 2, the user places their thumbs on the thumb pads on the front of the phone and their fingers on the buttons on the back of the phone. The phone is held between the palms. The right hand fingers interact with buttons 121 and left hand fingers with 123. On the display screen 103, a representation of a standard keyboard 133 containing all the letters and basic punctuation accessible from the basic typing Home Position is shown. Also on screen is a field 131 displaying the typed text.

Boxed letters 135 in FIG. 1 represent the home position of fingers on the standard keyboard, and also the current letters typed by the associated fingers. The boxed letters may be indicated by a bold or colored display or some other character emphasis such as underlining or background coloring.

To type an "a", a user would press the button under their left pinky on the back 123, at bottom. To type a "j", one would press the button under your right forefinger on the back 121, at top.

The thumb pad arrows 107 move the highlighting to different letter sets, as if you were moving your fingers up or down a row from the home position on a standard keyboard.

Figure 3A:
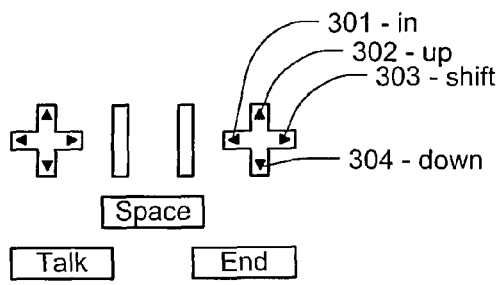
FIGS. 3A-3C illustrate alternative keyboard arrangements for front side keys which are used to modify the operation of back side keys.
Figure 3B:
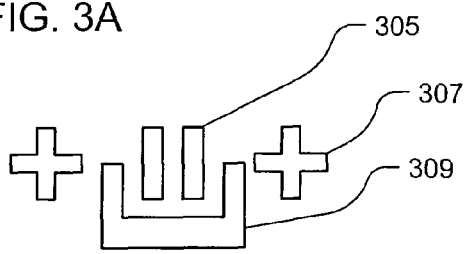
Figure 3C:
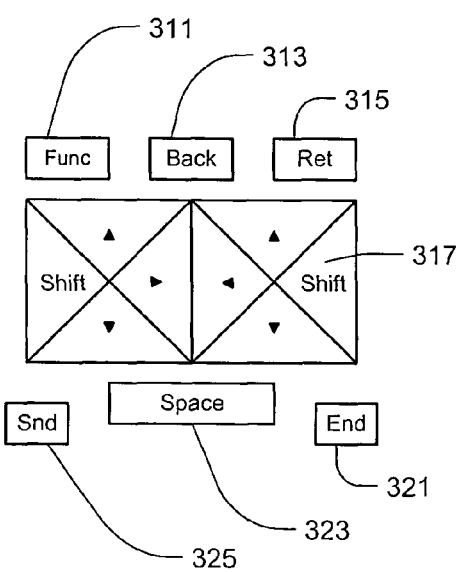

Alternative configurations of the thumb keys are shown in FIGS. 3A-3C. In FIG. 3A, the thumbs key 107 are annotated to correlate states with "in" 301, which causes the first finger of the right hand to stroke "h", with "up" 302, which causes the same finger to stroke "u", with "down" 304, which generates an "m" and with "shift" 303, which capitalizes a "J". Similarly, on a standard keyboard you would type a "t" with your left index finger, stretching up and right from it's home key of "f". To type "t" on a Quick-Key device use your thumbs to press "up" and "in", highlighting the "t" and the "y", now the button under your left index finger will type a "t". These shift operations are further illustrated in FIGS. 6A-6F, which are explained below. Notice that the spacebar sits between the thumbs as on a normal keyboard. An ENTER key and a BACKSPACE key 105 are also found between the thumbs.

FIG. 3B depicts a wrap around spacebar 309, in combination with the familiar multi-state thumb control 307 and other thumbkeys 305.

FIG. 3C illustrates a quadrilateral pad 317 in place of a cross shaped pad 307. As marked, the states of the pad replicate the states of the cross shaped pad. Other alternatives form factors for a thumb control that can replicate these states include a mini-joy stick, an eraser button stick (as used on some IBM Thinkpads®), a miniature track ball (as used on the Apple MightyMouse™), closely spaced buttons, and a touch screen, as used on laptops. The layout in FIG. 3C includes additional keys for function/alt/control/Windows/Apple command 311, backspace 313, return/enter 315, send/talk 325 and end 321. The space bar 323 is accessible to both thumbs, as on a standard keyboard.

To type a "T" the user would press "up", "in", and "shift" with the thumbs to make the button under the left index finger type a "T". See FIG. 6F. The Inverse thumb pattern ("up", "in", and "shift") will also make the left index finger type a "T" since pressing "in" highlights the letters in the center of the keyboard usable by both hands. For an experienced user who is types well, both "up" and "in" modifiers may be pressed with one thumb, while the other thumb starts to set up for the next character. For example to type the word "tomorrow" the user's left thumb would press "up", and "in" for the "t" but if the right thumb pressed "up" as well this would highlight the "t" for the left index finger and the characters "u, i, o, p" for the fingers of the right hand. So the user can type the "t" while the other hand is highlighting the "o" in preparation. This makes it easier to quickly highlight the characters you need in succession.

What if we need more punctuation or symbols like "!@#$%^&*( )"|\'"? Pressing both shift keys at the same time or some other key or two thumb combination toggles to a screen of additional characters. The toggle may be reversed by pressing enter key or pressing the original key combination a second time, to return to the normal keyboard mode. In this example, to enter numbers the user would use the number keys 113 on the front of the phone. In the case that the system was used in the field of commercial data entry the numerical pad would be configured like a 10 key, or like the number-pad that sits on the right of a standard keyboard. If the system were used on a mobile device in an application that did not require easy access to the numerals then the software could allow access to a numeric character set 133, like in the case of the additional characters of the keyboard, without need for a separate numeric key pad 113.

For experienced Quick-Keyers the software has several modes. The main mode is demonstrated here. Another mode displays more of the entered text/data and only the characters of the keyboard the user is currently highlighting. The visual of the keyboard can also be turned off for expert users.

Typing on a Mobile Quick-Key device uses the same fingering patterns as a standard keyboard, except instead of moving your fingers from key to key you use your thumbs to select the grouping of letters that your fingers will type. This system cuts down on the motion of typing and has potential to be faster than a standard keyboard.

FIGS. 6A-6F illustrate some of what we describe above in words. In FIG. 6A, one sees the effect of the "up" signal/modifier 302 from a thumb pad on the decoding of the finger key strokes. FIG. 6B depicts the effect of the "down" signal 304. FIGS. 6B-6C depict alternative encodings of the "in" signal 301. In one embodiment, the "in" modifier impacts the encoding of the first finger key of the right and left hands. To reach the "ty" or "bn" positions, the "in" signal is combined with the "up" or "down" modifier, respectively. This consistently applies the meaning of the modifiers. The alternative embodiment in FIG. 6C depicts a variation on the "in" modifier which gives functions to three finger keys on each hand. The first finger could encode any of the three vertically aligned letters. If the first finger encoded the top row character, the second and third keys might encode down the column. If the first finger encoded the home row "gh" keys, the third and fourth fingers might encode the first and third rows. If the first finger encoded the bottom row character, the second and third keys might encode up the column. The "in" encodings of FIGS. 6C-6D could be user selectable individually or in combination, with the 6C encoding optionally overriding the 6D encoding when "in" is modified by "up" or "down".

In FIG. 4, a housing that more closely matches a PDA than a cell phone is depicted. Housing simulations reveal that a wider housing allows firmer control of the housing between the palms of the user's hands, which may reduce the likelihood of misinterpreted key presses, because the fingers play less of a role in carrying the device's weight. Alternatively, a narrow housing may include a ridge or other non-active position that one or more fingers can rest upon to support the weight of the housing. The wider housing in FIG. 4 also supports larger buttons, which can be uniquely shaped or spaced from the edge of the housing to help the user feel when fingers are efficiently aligned.

Figure 5A:
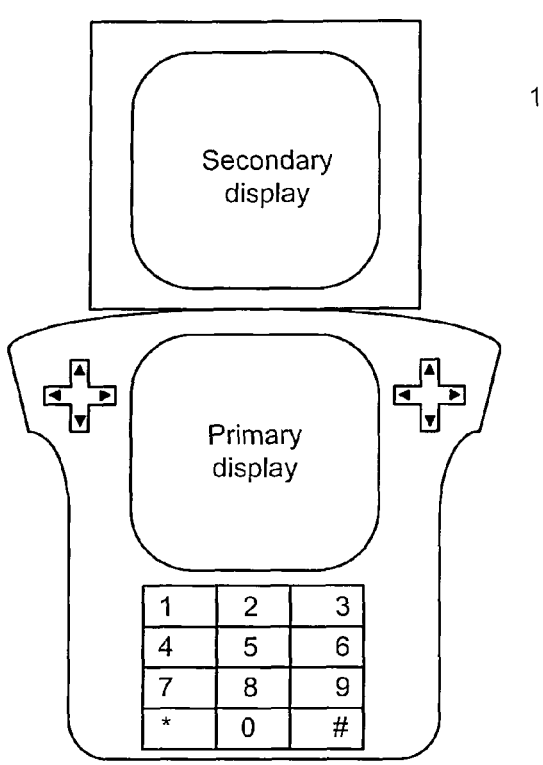
FIGS. 5A-5B illustrate front and back keyboard arrangements for a game controller sized device.
Figure 5B:
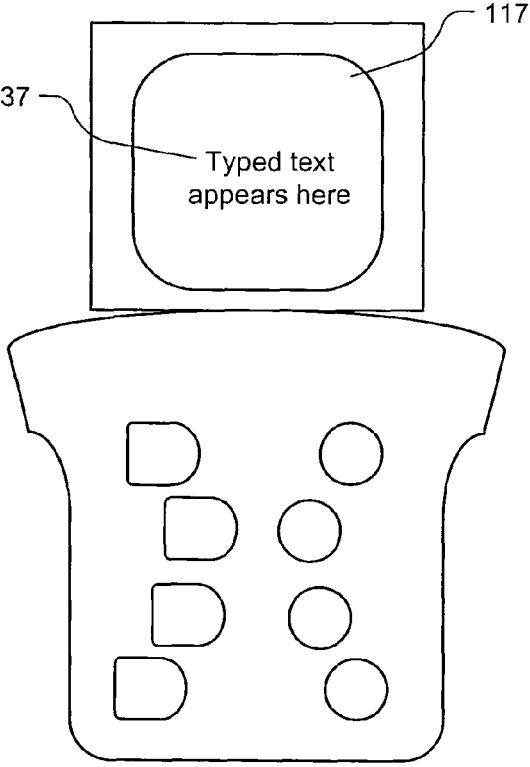

The FIGS. 5A-5B housing is similar to one version of a video game controller. The backside finger key configuration that we describe is well adapted to many game controller form factors. Some game controller form factors are too small to accommodate four finger keys on the back side. Controllers for Xbox 360® and Sega Dreamcast® are large enough to comfortably accommodate finger keys on the back side. In FIGS. 5A-5B, multiple local displays are added to a housing configuration that might be used as a game controller. A standalone device in this general form factor would include at least one user facing display. The user facing display could be omitted if the housing were for a device controller and the device was coupled to a display. If it were used for communicating with another person, either by a non-speaking person communicating in their own language or through translating software between persons speaking different languages, at least two displays on opposing sides of the housing would be useful, although not absolutely required.

The hardware of the Quick-Key system will be able to support mouse functions in operating systems, game controller configuration, quick controls for media players and with wireless capability can function as a wireless keyboard for computers. As a wireless keyboard, the finger and thumb key configurations disclosed would not need a display, because the computer display (or other video display) would provide the functionality described.

Some Particular Embodiments

The technology may be practiced as a device or as a method that processes simultaneous touches of finger and thumb keys positioned on generally opposing sides of a device. The invention may be an article of manufacture such as media impressed with logic to processes simultaneous touches of finger and thumb keys positioned on generally opposing sides of a device.

The first embodiment of the technology disclosed is a housing assembly for a hand-held electronic device. The assembly includes a housing comprising a first display screen, a front, a back and a circumferential edge joining the front and the back. The housing is constructed to be supportable by and between the user's right-hand and left hand, with the user's right and left thumbs positioned at the front and the user's right and left hand figures positioned at the back of the housing. Thumb keys on the front of the housing or position to be accessible to the user's right and left hand thumbs. Finger keys on the back are positioned to be accessible to the user's right and left hand fingers.

If the housing is coupled in communication with a device that has its own display, the first display screen can be omitted from this embodiment.

In one configuration, the housing assembly is generally rectangular.

One aspect of the design may include a main housing and the display housing extending from the main housing. The display housing may extend from the main housing using either a sliding action or a flip phone action. The display housing includes a first display screen facing the user and optionally may include a second display screen that can be shown to an additional personal while the user is looking at the first display screen.

One aspect of the design may be that the housing is sized and configured to accommodate at least four right-hand figure keys and at least four left-hand finger keys. The thumb keys may comprise a plurality of right thumb keys and a plurality of left thumb keys. The thumb keys may be configured as a tiltable pad, buttons, a joystick or a touch sensitive pad. The thumb keys may include right and left thumb keys that are placeable and at least three states and may include additional keys for back spacing, enter/return and spacebar.

The front side of the housing may include an additional data entry device, such as a numeric entry device. The numeric entry device can include either keys or a touchpad.

In another embodiment, a hand-held electronic device includes a housing comprising a first display screen, a front, a back and a circumferential edge joining the front and back. Logic and resources are contained within the housing that are coupled to a data entry device carried by the housing. The housing is constructed to be supportable by and between the user's right and left hands with the user's right and left thumb's position that the frond and the user's right and left hand fingers position at the back. The device further includes finger keys, operably coupled with logic and resources, on the back positioned to be accessible to the user's right and left hand fingers. It also includes some keys, operably coupled to the logic and resources, on the front positioned to be usable to a user's right and left hand thumbs.

If the housing is coupled in communication with a device that has its own display, the first display screen can be omitted from this embodiment.

The hand-held electronic device may be a cell phone, a personal digital assistant, or language translator. Alternatively, it may be a game console controller. The finger keys may comprise first second third and fourth right-hand finger keys and first, second, third fourth left-hand finger keys. Thumb keys on the front side may be placeable in shift states from a home state. The finger keys may correspond to a set of keyboard characters according to the state of the thumb keys, the set of keyboard characters taken from characters of a chosen typing keyboard, such as the QWERTY keyboard. The logic and resources, coupled to the first display screen, may cause a display to indicate keys that can be invoked using the finger keys and, optionally, the status of shift key operation.

In some embodiments, the first, second, third and fourth right-hand and left-hand finger keys correspond to home state keyboard characters of a chosen typing keyboard so that a user's typing muscle memory can be used when entering keyboard characters with the finger keys.

The logic and resources may update characters on the first display screen according to the shift states of the thumb keys.

In a further aspect, the logic and resources a display keyboard characters on the first screen, the keyboard characters selected using the finger keys and the thumb keys, the display keyboard characters further taken from the characters of a chosen typing keyboard. In the illustrated figures, the chosen typing keyboard is a standard English language keyboard. Alternatively, the keyboard could be supplemented with special characters of Romance languages. It could be adapted to keyboard layouts used in languages that have different character sets, while still taking advantage of a user's muscle memory for typing on a keyboard of those languages.

A further aspect of the device disclosed is that the thumb keys include right and left thumb keys placeable in at least three states, a backspace thumb key, and enter thumb key and a spacebar thumb key.

As in the first embodiment, this embodiment may include a second display screen facing in a direction generally opposite the first display screen, wherein the logic and resources repeat the least that typed characters on the first and second display screens based upon selection of finger keys and thumb keys. As the user types, the characters displayed will comprise a least one word.

Logic and resources may further be adapted to translate a typed language into a foreign language. The foreign language may be displayed by itself or simultaneously with the typed language on either the first or second display, or both.

I claim as follows:

1. A housing assembly for a hand-held electronic device comprising:

a housing comprising a first display screen, a front, a back and a circumferential edge of joining the front and the back;

the housing constructed to be supportable by and between a user's right and left hands with the user's right and left thumbs positioned at the front and at the user's right and left hand fingers positioned at the back;

thumb keys on the front positioned to be accessible to a user's right and left hand thumbs, the thumb keys placeable in at least three modifier states that modify interpretation of finger keys from home row to non-home row keystrokes without requiring the user to reposition their fingers; and the finger keys on the back positioned to be accessible to a user's right and left hand fingers.

2. The housing assembly according to claim 1 wherein the housing is generally rectangular.

3. The housing assembly according to claim 1 wherein the housing is sized and configured to accommodate at least four right-hand finger keys and at least four left-hand finger keys.

4. The housing assembly according to claim 1 wherein the thumb keys comprise a plurality of right thumb keys and a plurality of left thumb keys.

5. The housing assembly according to claim 1 further comprising a data entry device carried by the housing.

6. The housing assembly according to claim 5 wherein the data entry device comprises a numeric entry device.

7. The housing assembly according to claim 6 wherein the numeric entry device comprises a touchpad.

8. The housing assembly according to claim 1 wherein the thumb keys comprise backspace thumb key, an enter thumb key and a spacebar thumb key.

9. A housing assembly for a hand-held electronic device comprising:

a housing comprising a first display screen, a front, a back and a circumferential edge of joining the front and the back;

the housing constructed to be supportable by and between a user's right and left hands with the user's right and left thumbs positioned at the front and at the user's right and left hand fingers positioned at the back;

thumb keys on the front positioned to be accessible to a user's right and left hand thumbs. the thumb keys placeable in at least three modifier states that modify interpretation of finger keys;

the finger keys on the back positioned to be accessible to a user's right and left hand fingers: and a main housing and a display housing extending from the main housing, the display housing comprising first and second sides, the first side comprising the first display screen.

10. The housing assembly according to claim 9 wherein the second side comprises a second display screen so that information can be viewed from both sides of the display housing.

11. A hand-held electronic device comprising:

a housing comprising a first display screen, a front, a back and a circumferential edge joining the front and the back;

logic and resources contained within the housing operably coupled to the first display screen;

a data entry device carried by the housing operably coupled to the logic and resources;

the housing constructed to be supportable by and between a user's right and left hands with the user's right and left thumbs positioned at the front and at the user's right and left hand fingers positioned at the back;

finger keys, operably coupled to the logic and resources, on the back positioned to be accessible to a user's right and left hand fingers; and thumb keys, operably coupled to the logic and resources, on the front positioned to be accessible to a user's right and left hand thumbs;

wherein some of the thumb keys are placeable in non-home states and characters selected by the finger keys change from home row characters to non-home row characters responsive to the non-home states, whereby the user is not required to reposition their fingers away from a home row in order to type the non-home row characters.

12. The handheld electronic device according to claim 11 wherein the handheld electronic device comprises at least one of a cell phone, personal digital assistant and language translator.

13. The handheld electronic device according to claim 11 wherein the finger keys comprise first, second, third and fourth right-hand finger keys and first, second, third and fourth left-hand finger keys positioned to be accessible by the right hand and left hand fingers of a user.

14. The electronic device according to claim 13, wherein the first, second, third and fourth right-hand and left-hand finger keys correspond to home state keyboard characters of the chosen typing keyboard so that a user's typing muscle memory can be used when entering keyboard characters.

15. The electronic device according to claim 14 wherein the logic and resources mark selected keyboard characters on the first display screen according to shift states of the thumb keys.

16. The handheld electronic device according to claim 11, wherein the logic and resources displays on the first display screen keyboard characters at locations corresponding to the locations of the characters of the chosen typing keyboard.

17. The electronic device according to claim 11 wherein the logic and resources displays keyboard characters on the first display screen, the keyboard characters selected using the finger keys and the thumb keys, the displayed keyboard characters taken from the characters of a chosen typing keyboard.

18. The electronic device according to claim 17 wherein the thumb keys comprise a right thumb key placeable in at least three states, a left thumb key placeable in at least three states, backspace thumb key, an enter thumb key and a spacebar thumb key.

19. A hand-held electronic device comprising:

a housing comprising a first display screen. a front. a back and a circumferential edge joining the front and the back;

logic and resources contained within the housing operably coupled to the first display screen;

a data entry device carried by the housing operably coupled to the logic and resources;

the housing constructed to be supportable by and between a user's right and left hands with the user's right and left thumbs positioned at the front and at the user's right and left hand fingers positioned at the back;

finger keys, operably coupled to the logic and resources, on the back positioned to be accessible to a user's right and left hand fingers; and thumb keys, operably coupled to the logic and resources, on the front positioned to be accessible to a user's right and left hand thumbs;

wherein some of the thumb keys are placeable in non-home states and characters selected by the finger keys change away from home row characters responsive to the non-home states; and wherein the housing comprises a second display screen facing a direction opposite the first display screen, and wherein the logic and resources displays characters on the first and second display screens based upon the selection of finger keys and thumb keys, the characters displayed on the first display screen comprising at least one word.

20. The electronic device according to claim 19 wherein the characters displayed on the second display screen comprises a translation of the at least one word displayed on the first display screen.

21. A hand-held electronic device comprising:
- a housing comprising a first display screen, a front, a back and a circumferential edge joining the front and the back;
- logic and resources contained within the housing;
- a data entry device carried by the housing operably coupled to the logic and resources;
- the housing constructed to be supportable by and between a user's right and left hands with the user's right and left thumbs positioned at the front and at the user's right and left hand fingers positioned at the back;
- finger keys, operably coupled to the logic and resources, on the back positioned to be accessible to a user's right and left hand fingers; and
- thumb keys, operably coupled to the logic and resources, on the front positioned to be accessible to a user's right and left hand thumbs;
- wherein the thumb keys modify operation of at least some of the finger keys from generating home row keystrokes to generating non-home row keystrokes.

* * * * *